June 7, 1966  C. H. WALTER ETAL  3,255,452
SURFACE WAVE LUNEBERG LENS ANTENNA SYSTEM
Filed Jan. 28, 1964  4 Sheets-Sheet 1

INVENTORS

CARLTON H. WALTER
ROGER C. RUDDUCK

INVENTORS
CARLTON H. WALTER
ROGER C. RUDDUCK

June 7, 1966                C. H. WALTER ETAL                3,255,452
               SURFACE WAVE LUNEBERG LENS ANTENNA SYSTEM
Filed Jan. 28, 1964                                    4 Sheets-Sheet 3

INVENTORS
CARLTON H. WALTER
ROGER C. RUDDUCK

June 7, 1966  C. H. WALTER ET AL  3,255,452
SURFACE WAVE LUNEBERG LENS ANTENNA SYSTEM
Filed Jan. 28, 1964  4 Sheets-Sheet 4

INVENTOR.
CARLTON H. WALTER
BY ROGER C. RUDDUCK

3,255,452
SURFACE WAVE LUNEBERG LENS ANTENNA SYSTEM
Carlton H. Walter, 3828 Mount View, and Roger C. Rudduck, 1217 Mulford Road, both of Columbus, Ohio
Filed Jan. 28, 1964, Ser. No. 341,493
6 Claims. (Cl. 343—753)

This invention relates in general to radio antennas operable in the microwave region and in particular to a surface-wave Luneberg lens antenna. This application is a continuation-in-part of my co-pending application Serial Number 79,434, filed December 29, 1960, now abandoned.

As a result of basic theoretical work by R. K. Luneberg, on the optics in a medium of variable index of refraction, there resulted in a type of lens that has many applications in microwave antennas. Luneberg showed that if a dielectric sphere of unit radius has an index of refraction $n$ satisfying the relation (1) $$n = \sqrt{2 - r^2}$$

where $r$ is the distance from the center of the sphere, then a plane wave incident on the sphere would focus at a point on the surface of the sphere diametrically opposite from the incident plane wave.

Many recent studies and publications have been completed on microwave structures of both spherical and cylindrical shapes having the radial variation in $n$ given by the above Equation 1. Emphasis has been placed on techniques for obtaining the necessary radical variation in $n$, as well as on modifications and applications. The electromagnetic theory of the Luneberg lens is considered by H. Jasik, "The Electromagnetic Theory of the Luneberg Lens," Report TR 54–121, Air Force Cambridge Research Center, Bedford, Mass., November 1954, for the cylindrical lens, and by C. H. Wilcox, "The Refraction of Plane Electromagnetic Waves by a Luneberg Lens," Report MSD 1802, Lockheed Aircraft Corporation, Van Nuys, California, June 1956, and C. T. Tai, "The Electromagnetic Theory of the Spherical Luneberg Lens," Report 667–17, The Ohio State University Research Foundation, Columbus, Ohio, August 1956, for the spherical lens. Jasik solved for the far field of the cylindrical lens and obtained numerical results for both omnidirectional and dipole sources. Jasik found good agreement between the results of his exact solution and the results he obtained by optical methods for a lens diameter as small as three wavelengths. Wilcox solved for the fields at or near the focus for a plane wave incident on a spherical lens. Tai's solution for the spherical lens is more general; it can be used to find the far field with excitation at the focus or the field near the focus for a plane wave incident on the lens. Recent work by E. H. Braun, "Radiation Characteristics of the Spherical Luneberg Lens," IRE Transactions on Antennas and Propagation, volume AP–4, No. 2, April 1956, on the spherical Luneberg lens gives the beam width, gain and side lobe level of the far-field pattern for various distributions of electric and magnetic fields over the surface of the lens.

Another basic study that has been applied to microwave antennas recently is that of surface-wave propagation. An electromagnetic surface wave can be defined as an electromagnetic wave that propagates along an interface between two media, such as that formed by the structure and free space. The earliest work on this subject appears to be that of A. Sommerfeld, "Fortpflanzung Electrodynamischer Wellen an einem zykindrischen Leiter," Ann. Phys. U. Chemie, vol. 67, p. 233, 1899, who discussed the propagation of a transverse magnetic surface wave along an infinitely long cylindrical wire of finite conductivity. Important contributions have been made by C. C. Cutler with his work on electromagnetic waves guided by corrugated conducting surfaces, G. Goubau, "Surface Waves and Their Applications to Transmission Lines," Journal of Applied Physics, volume 21, 1950, p. 1119, with his work on electromagnetic waves guided by a dielectric coated wire, and S. S. Atwood with his work on "Surface-Wave Propagation Over a Coated Plane Conductor." A good summary and an extensive bibliography on surface waves have been presented by F. J. Zucker in his paper, "The Guiding and Radiation of Surface Waves," Proceedings of the Symposium on Modern Advances in Microwave Techniques, Polytechnic Institute of Brooklyn, New York, November 1954.

In my copending application Serial Number 777,524, filed December 1, 1958, now Patent No. 3,108,278, for "Surface Wave Luneberg Lens Antenna System," I disclosed a surface-wave structure that can be made to perform as a Luneberg lens. In particular, it was shown that the index of refraction of a surface-wave structure can be found by the equation (2) $$\frac{c}{v} = n = \sqrt{2 - r^2}$$

where $c$ = velocity of light in free space
$v$ = phase velocity of the surface wave
$r$ = normalized radius It is further shown that a circular dielectric sheet on a ground plane can be made to perform as a Luneberg lens in the plane of the sheet and at the same time perform as an endfire antenna in the orthogonal plane.

The antenna of my copending application, supra, although of practical utility is nonetheless limited to a planar surface. It has been found that in applications of the surface-wave Luneberg lens or more conventional two-dimensional Luneberg lenses, it may be necessary at times to mount a lens on a non-planar surface. This requirement is generally a result of the geometry of the surface on which the lens is to be mounted.

For instance, the surface-wave Luneberg lens is particularly adaptable to skin structures which may form the outside of an aircraft, motor vehicle or marine craft. However, in most of these applications, the actual area desired to be adapted into the surface-wave structure will not be planar and may attain a shape of many varied forms. Further, it is also in present day use inflatable structures of one form or another and serving various purposes. In each of these structures, the outside skin or shell will have some shape other than planar. In each of these instances the planar surface-wave structure would, of course, not readily adapt itself.

The present invention teaches a surface-wave Luneberg lens that is adaptable to any type of non-planar surface. A Luneberg lens on a non-planar surface is described wherein the results are applicable to either a convex or concave spherical surface. It is also shown that a similar lens is adaptable to a parabolic surface, a conical surface or to any other non-planar surface. There is retained, however, the utility of the planar surface-wave Luneberg lens and its attendant features. That is, in the non-planar surface of the present invention, an incident plane wave travelling parallel to the base of the surface and striking the dome will focus diametrically opposite on the rim of the dome in the exact manner of operation as that of the planar structure. Other advantages of a Luneberg lens resulting from the index of refraction being a function only of the radius such as 360° scanning is also retained by the structure of this invention. A practical embodiment of the invention is illustrated wherein the index of refraction is achieved by capping a spherical dome with a surface-wave structure, or by forming a parallel-plate transmission line over the spherical dome.

Accordingly, it is a principal object of the present invention to provide a new and improved Luneberg lens that is operable from a surface structure that is a non-planar surface and yet retains the utility of a planar surface-wave structure operable as a Luneberg lens.

It is a further object of the present invention to provide a new and improved surface-wave Luneberg lens that is adaptable to a spherical surface that may be either convex or concave.

Another object of the present invention is to provide a new and improved surface-wave Luneberg lens antenna that is adaptable to a parabolic surface.

Another object of the present invention is to provide a new and improved surface-wave Luneberg lens antenna that is adaptable to a conical surface.

Another object of the present invention is to provide a new and improved surface-wave Luneberg lens antenna that is adaptable to a surface with symmetry such that the index of refraction may be expressed as a function of radial distance only.

Still another object of the present invention is to provide a new and improved surface-wave Luneberg lens antenna that may be adaptable as a flush mounted rim radiating antenna on any radially symmetric non-planar surface.

Other objects and features of the present invention will become apparent from the following detailed description when taken in conjunction with the drawings in which.

Figure 2:
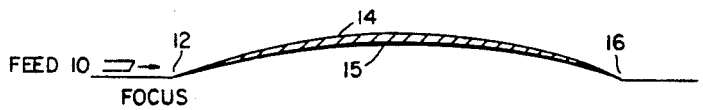
FIGURE 2 is a schematic illustration of the principles of the invention applicable to a surface-wave structure spherical cap lens operable as a Luneberg lens antenna.
Figure 3:
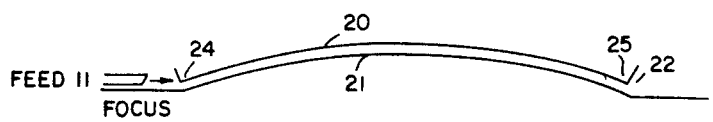
FIGURE 3 is another schematic illustration of the principles of the invention applicable to a parallel plate structure as a spherical cap lens operable as a Luneberg lens antenna.

It may be desired at times to adapt an antenna to structure that is not amenable to a protruding type of antenna or reflector and further which structure may not have a planar surface that may be converted into a surface-wave type of antenna. Referring to the schematic illustration of FIGURE 1, there is shown a spherical dome. It has been found that with a given index of refraction that an incident plane wave travelling parallel to the ground plane (or base of the dome in the absence of a ground plane) and striking the dome will focus diametrically opposite on the rim of the dome, thereby functioning in a manner similar to that of a Luneberg lens. In practice, the necessary variation in index may be achieved by capping the spherical dome with a surface-wave structure or by forming a parallel-plate transmission line over the spherical dome. The embodiments are shown in FIGURE 2 and FIGURE 3 and will be referred to hereinafter. It further has been found that lens action may be obtained for any transverse magnetic, transverse electric or two dimensional type Luneberg lens on either a convex spherical surface or a concave spherical surface.

Figure 1:
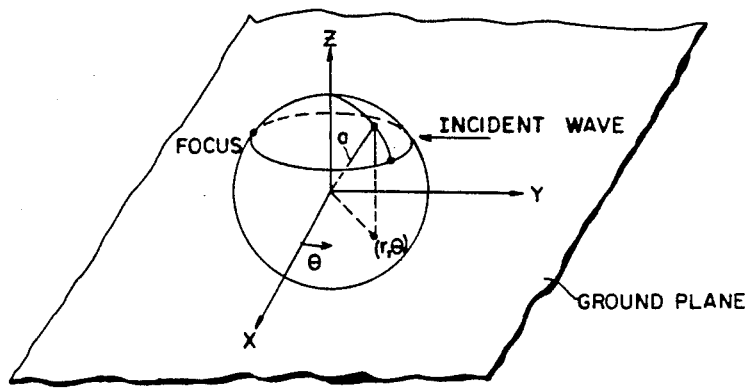
FIGURE 1 is a schematic illustration of the principles of the invention applicable to a surface-wave on a spherical surface operable as a Luneberg lens antenna.

From the spherical dome and its coordinate system formed by intersection of a sphere of radius $a$ and a plane at $Z=\sqrt{a^2-1}$ illustrated in FIGURE 1, the following analysis is obtained:

(3) $$r^2+z^2=a^2$$

Differentiating with respect to $r$ gives (4) $$2r+2z\frac{dz}{dr}=0$$

which reduces to $$dz=\frac{\pm r}{\sqrt{a^2-r^2}}dr$$

or (5) $$dz=\frac{\pm r}{\sqrt{a^2-r^2}}\frac{dr}{d\theta}d\theta$$

Figure 4:
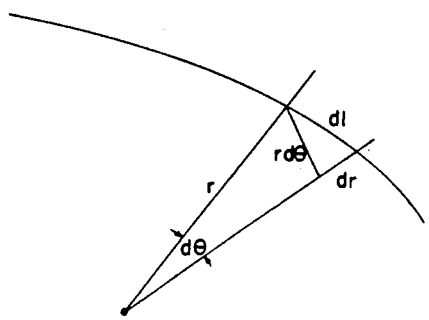
FIGURE 4 is a graphical illustration of the optical path length between two points on the spherical surface $Z=\sqrt{a^2-1}$ for purposes of illustrating the analysis of the structure given in FIGURE 1.

An element of path length in the plane $Z=\sqrt{a^2-1}$, referring for the moment to FIGURE 4, is given by $$dl^2=(rd\theta)^2+dr^2$$

which may be written as (6) $$dl^2=\left[r^2+\left(\frac{dr}{d\theta}\right)^2\right]d\theta$$

An element of path length $dL$ along the spherical surface is given by (7) $$dL^2=dl^2+dz^2$$

Substituting from Equations 5 and 6 gives (8) $$dL^2=\left[r^2+\frac{a^2}{a^2-r^2}\left(\frac{dr}{d\theta}\right)^2\right]d\theta^2$$

The optical path length between two points on the spherical surface is given by (9) $$L=\int_{\theta_1}^{\theta_2}ndL$$

where $n$ is the index of refraction.
Equation 9 is of the form

(10) $$L=\int_{\theta_1}^{\theta_2}f\left(r,\frac{dr}{d\theta}\right)d\theta$$

where

(11) $$f=n\left[r^2+\frac{a^2}{a^2-r^2}\left(\frac{dr}{d\theta}\right)^2\right]^{1/2}$$

By Fermat's principle, the path $L$ is a path of least time. From the calculus of variations there is obtained for a region of radial symmetry an Euler equation of the form

(12) $$\frac{d}{d\theta}\left[\frac{\partial f}{\partial\left(\frac{dr}{d\theta}\right)}\right]-\frac{\partial f}{\partial r}=0$$

Integrating with respect to $r$ gives

(13) $$f - \frac{dr}{d\theta}\left[\frac{\partial f}{\partial\left(\frac{dr}{d\theta}\right)}\right] = k$$

where $k$ is a constant determined by an individual ray path.

From Equations 11 and 13,

(14) $$k = \frac{nr^2}{\left[r^2 + \frac{a^2}{a^2 - r^2}\left(\frac{dr}{d\theta}\right)^2\right]^{1/2}}$$

Solving Equation 14 with respect to $d\theta/dr$ gives

(15) $$\frac{d\theta}{dr} = \pm \frac{k}{r\sqrt{n^2r^2 - k^2}} \frac{a}{\sqrt{a^2 - r^2}}$$

Integrating gives

(16) $$\theta - \theta_0 = \pm ka\int_{r_0}^{r} \frac{dr}{r\sqrt{a^2 - r^2}\sqrt{n^2r^2 - k^2}}$$

Equation 16 is a general equation of the ray path on a spherical surface passing through $(r, \theta)$ and $(r_0, \theta_0)$.

Figure 5:
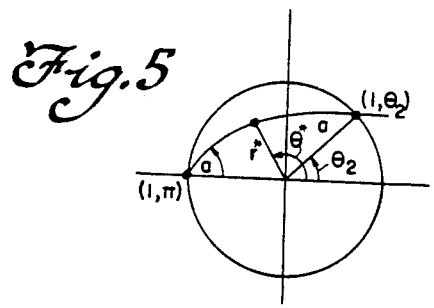
FIGURE 5 is an illustration of the spherical dome surface as viewed from Z axis, also for purposes of illustrating the analysis of the structure given in FIGURE 1.

Let the point $(r_0, \theta_0)$ be the point of focus $(l, \pi)$ at the rim of the dome. The spherical dome as seen from the $z$ axis is shown in FIGURE 5. Let the point $(l, \theta_2)$ be the point at which a ray leaves the dome. The point where $dr/d\theta$ is zero is defined as the turning point. This point is designated as $(r^*, \theta^*)$, as illustrated in FIGURE 5.

Equation 16 may now be expressed as $$\theta_2 - \pi = ka\int_1^{r^*} \frac{dr}{r\sqrt{a^2 - r^2}\sqrt{n^2r^2 - k^2}}$$
$$- ka\int_{r^*}^{1} \frac{dr}{r\sqrt{a^2 - r^2}\sqrt{n^2r^2 - k^2}}$$

which becomes

(17) $$\theta_2 - \pi = 2ka\int_1^{r^*} \frac{dr}{r\sqrt{a^2 - r^2}\sqrt{n^2r^2 - k^2}}$$

The general equation for a ray path on a plane is given by

(18) $$\theta - \theta_1 = \pm k\int_{r_1}^{r} \frac{dr}{r\sqrt{n^2r^2 - k^2}}$$

Let
$$(r, \theta) = (1, \theta_2)$$
$$(r_1, \theta_1) = (\infty, 0^*)$$

Equation 18 becomes

(19) $$\theta_2 = k\int_1^{\infty} \frac{dr}{r\sqrt{n^2r^2 - k^2}}$$

Equation 19 represents a ray from the rim of the lens to infinity, whereas Equation 17 represents the ray from the focus on the rim to the exit point at the rim again referring to FIGURE 5. Combining Equations 17 and 19 gives

(20) $$\pi = k\int_1^{\infty} \frac{dr}{r\sqrt{n^2r^2 - k^2}} + 2ka\int_{r^*}^{1} \frac{dr}{r\sqrt{a^2 - r^2}\sqrt{n^2r^2 - k^2}}$$

Equation 2 is the general equation for a spherical cap lens with foci at the rim and at infinity.

Assume that the index is unity for $r \geq 1$. This is usually the case in practice. With this restriction on $n$ the first integral in Equation 20 becomes

(21) $$k\int_1^{\infty} \frac{dr}{r\sqrt{r^2 - k^2}} = \frac{\pi}{2} - \cos^{-1} k$$

Substituting Equation 20 into 21 gives

(22) $$2ka\int_{r^*}^{1} \frac{dr}{r\sqrt{a^2 - r^2}\sqrt{n^2r^2 - k^2}} = \frac{\pi}{2} + \cos^{-1} k$$

Finding an expression for $n$ that satisfies Equation 22 may be accomplished by an appropriate transformation.

The turning point $(r^*, \theta^*)$ occurs at $dr/d\theta = 0$. Therefore, Equation 14 gives

(23) $$n(r^*)r^* = k$$

From the analysis given by S. P. Morgan, "General Solution of the Luneberg Lens Problem," Journal of Applied Physics, vol. 29, No. 9, September 1958, the following equation $n(r)$ may be given

(24) $$\rho(r) = n(r)r$$

and assume that $\rho$ is a continuous, strictly increasing function of $r$ with the restrictions $$\rho(0) = 0$$
$$\rho(1) = 1$$

and from 23 and 24, $$\rho(r^*) = k$$

An appropriate transformation is obtained by setting

(25) $$\log\left[\frac{a\sqrt{a^2 - r^2}}{r}\right] = G(\rho)$$

Then $$-a\frac{dr}{r\sqrt{a^2 - r^2}} = G'(\rho)d\rho$$

or

(26) $$\frac{dr}{r\sqrt{a^2 - r^2}} = \frac{-G'(\rho)d\rho}{a}$$

Substitution Equation 26 into 22 gives

(27) $$\int_1^k \frac{kG'(\rho)}{\sqrt{\rho^2 - k^2}}d\rho = \frac{1}{2}(\pi/2 + \cos^{-1} k)$$

Let

(28) $$F(k) = \frac{1}{2}(\pi/2 + \cos^{-1} k)$$

Replacing $\rho$ by $\sigma$, multiplying both sides of 27 by $(k^2 - \rho^2)^{1/2}$, and integrating with respect to $k$ from $k = \rho$ to $k = 1$, gives

(29) $$\int_\rho^1 dk \int_1^k \frac{kG'(\sigma)d\sigma}{[(\sigma^2 - k^2)(k^2 - \rho^2)]^{1/2}} = \int_\rho^1 \frac{F(k)}{(k^2 - \rho^2)^{1/2}}dk$$

Changing the order of integration on the left-hand side gives

(30) $$\int_1^\rho G'(\sigma)d\sigma \int_\rho^\sigma \frac{kdk}{[(\sigma^2 - k^2)(k^2 - \rho^2)]^{1/2}} = \int_\rho^1 \frac{Fk}{(k^2 - \rho^2)^{1/2}}dk$$

Consider the integral with respect to $k$,

(31) $$I = \int_\rho^\sigma \frac{kdk}{[(\sigma^2 - k^2)(k^2 - \rho^2)]^{1/2}}$$

Substituting $k^2 - t$ gives

(32) $$I = \frac{1}{2}\int_{\rho^2}^{\sigma^2} \frac{dt}{[(\sigma^2 - t)(t - \rho^2)]^{1/2}}$$

Performing the integration in Equation 32 gives

(33) $$I = \frac{1}{2}\left[\sin^{-1}\frac{\sigma^2 + \rho^2 - 2t}{\sigma^2 - \rho^2}\right]_{\rho^2}^{\sigma^2} = \pi/2$$

Therefore Equation 30 reduces to

(34) $$G(\rho) - G(1) = \frac{2}{\pi}\int_\rho^1 \frac{F(k)dk}{(k^2 - \rho^2)^{1/2}}$$

From standard integral tables

(35) $$\frac{dk}{(k^2 - \rho^2)^{1/2}} = \log\left(k + \sqrt{k^2 - \rho^2}\right)$$

From reference 2,

(36) $$\int_\rho^1 \frac{\cos^{-1} k \, dk}{(k^2 - \rho^2)^{1/2}} = -\frac{\pi}{2}\log\rho$$

Thus the right side of 34 reduces to $$(37) \quad \frac{2}{\pi}\int_\rho^1 \frac{F(k)}{(k^2-\rho^2)^{1/2}}dk = \log\frac{\sqrt{1+\sqrt{1+\rho^2}}}{\rho}$$

From Equation 25 the left side of Equation 34 reduces to $$(38) \quad G(\rho) - G(1) = \log\frac{a+\sqrt{a^2-r^2}}{r(a+\sqrt{a^2-1})}$$

Then from Equation 34 we have finally $$(39) \quad \log\frac{a+\sqrt{a^2-r^2}}{r(a+\sqrt{a^2-1})} = \log\frac{\sqrt{1+\sqrt{1-\rho^2}}}{\rho}$$

Therefore $$(40) \quad \frac{a+\sqrt{a^2+r^2}}{r(a+\sqrt{a^2-1})} = \frac{\sqrt{1+\sqrt{1-\rho^2}}}{\rho}$$

Solving Equation 40 for $n(r)$ gives $$(41) \quad n(r) = \frac{A\sqrt{2R^2 - A^2 r^2}}{R^2}$$

where $$A = 1 + \sqrt{1-\frac{1}{a^2}}$$

$$R = 1 + \sqrt{1-\left(\frac{r}{a}\right)^2}$$

Figure 6:
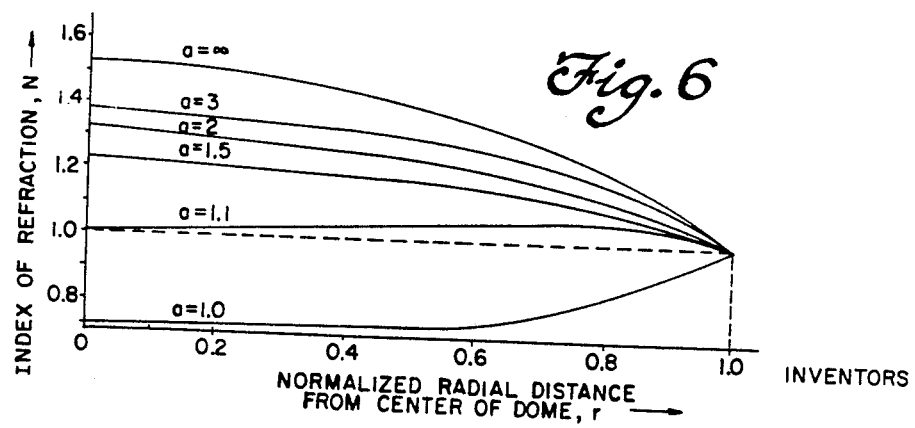
FIGURE 6 is a graph showing the index of refraction vs. radial distance for spherical domes of various radii.

This Equation 41 gives an index of refraction over the surface of a spherical dome of radius $a$ such that an incident plane wave travelling parallel to the base of the dome and striking the dome will focus diametrically opposite on the rim of the dome. When $a$ becomes infinite the expression reduces to that of the conventional Luneberg lens. A graph of (41) showing index of refraction vs. radial distance for spherical domes of various radii is given in FIGURE 6 for values of sphere radius $a$ ranging from unity to infinity. For $a$ equal to unity the dome is a hemisphere and the index over the dome is equal to or less than unity. An index equal to or less than unity is obtained for $a$ less than approximately 1.1.

Figure 7:
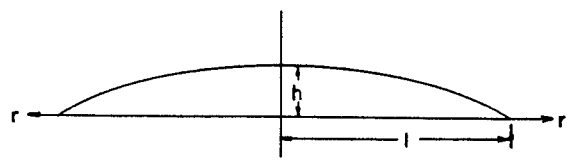
FIGURE 7 is schematic illustration in side view of the principles of the invention applicable to a parabolic surface-wave structure operable as a Luneberg lens.

The analysis of the spherically capped dome lens given above (41) has also been found to be equally applicable to a paraboloidal surface and a conical surface. The design equation for a paraboloidal surface shown schematically in FIGURE 7 is as follows:

It is necessary to solve for $n$ from the equation $$(42) \quad \sqrt{1+4h^2r^2} - \sqrt{1+4h^2} + \ln\frac{r(1+\sqrt{1+4h^2})}{1+\sqrt{1+4h^2r^2}} = \ln\frac{\rho}{\sqrt{1+\sqrt{1-\rho^2}}}$$

Where $\rho = nr$ and where $n$ and $r$ are defined above.

Figure 8:
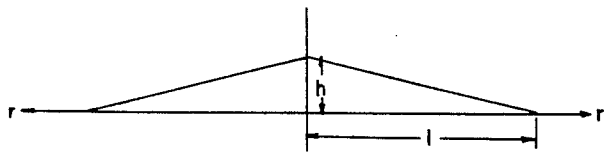
FIGURE 8 is a schematic illustration of the principles of the invention applicable to a conical surface-wave structure operable as a Luneberg lens.

The design equation for a conical surface shown schematically in FIGURE 8 is as follows:

$$(43) \quad n = r^{(\sqrt{1+h^2}-1)}\sqrt{2-r^{(2\sqrt{1+h^2})}}$$

Referring now back to FIGURES 2 and 3, there is illustrated a preferred embodiment of the present invention that illustrates practically the spherical surface-wave structure operable as a Luneberg lens. In FIGURE 2, the surface of the structure, which may be the underside on aircraft or the roof of a cabin cruiser is shown as 15. Capping this structure 15 is a surface-wave lens 14 of the invention. Surface-wave lens 14 is of dielectric material and has an index of refraction as herein above defined. The dielectric material per se is conventional and may be polystyrene or fiberglass. When a radio frequency signal, and in this particular instance in the microwave region, is incident at point 16 the incident wave will focus diametrically opposite point 16 on the dome or cap 14 at its rim 12.

Figure 3A:
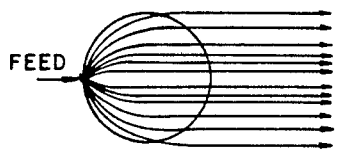
FIGURE 3a is a wave pattern representative of the Luneberg lens.

Alternatively, rather than cap the structure that is to support the surface-wave lens directly, which may not be desirable in certain types of craft, it has been found that equal results are obtainable by providing a parallel plate transmission lens type of capping structure over the surface of the craft. Such an embodiment is illustrated in FIGURE 3 and in perspective in FIGURE 11. This antenna comprises lower metallic plate 21 that blends into the ground plane 10, and upper metallic cap 20. Cap 20 is spatially placed, such as by a very low dielectric material or other suitable means, over the structure 21. In operation a radio frequency signal incident at point 22 will be guided between the structure 21 and the cap 20 and be focussed diametrically opposite point 22 at point 24 of the structure. In either the embodiment shown in FIGURE 2 or FIGURE 3, the rays representing the wave pattern are as shown in FIGURE 3a, which is representative of the conventional Luneberg lens.

Figure 9:
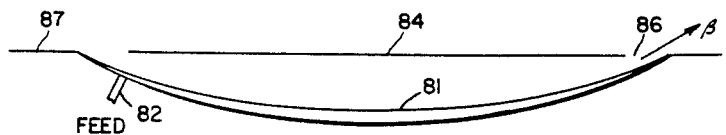
FIGURE 9 is a cross-sectioned sketch of a side view flush mounted rim-radiating non-planar surface-wave Luneberg lens.
Figure 9A:
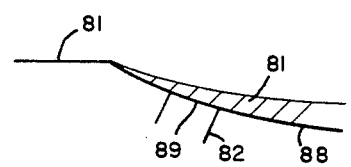
FIGURE 9a is an enlarged view of the feed to the lines.
Figure 10:
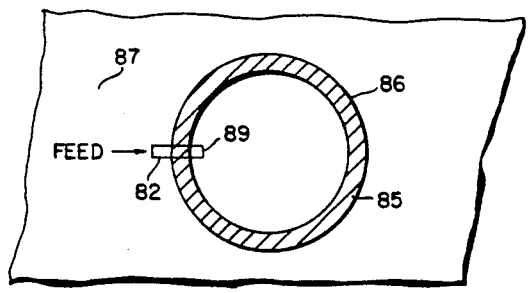
FIGURE 10 is a top view sketch of a flush mounted rim-radiating non-planar surface-wave Luneberg lens.

Another alternative embodiment of the present invention may be had by referring to FIGURES 9 and 10, wherein there is shown a flush mounted rim-radiating lens adapting the principles of the present invention. In this instance the contoured lens 81 is contoured below the plane of the ground plane 87 with the shield 84 being coplanar with the ground plane 87. In practice, the ground plane 87 is a portion of the surface structure of the craft and the contoured lens would be adapted to a cavity therein. That is, the ground plane 87 and the metallic supporting plate 88—surface structure—of the lens 81 is continuous. This arrangement results in a flush mounted antenna having all of the attendant advantages of a Luneberg lens. The signal is either transmitted or received at point 89 by feed 82. FIGURE 9a is an exploded view of the manner of construction of the feed 82 into the lens 81. The open end of the feed 82 is directed into a slot 89 in the lower supporting structure 88 of the lens 81. In practice, the feed 82, being a wave guide, will be joined to the structure 88 and its open end will feed the energy directly through the slot 89 into the lens 88. The shield 84 is smaller in diameter than the inner face of the lens 81, thereby permitting a circular aperture 86 for a wave transmission (or reception) as indicated by the arrow.

Figure 13:
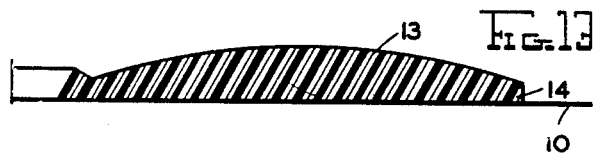
FIGURE 13 is a cross-sectional sketch of a side view of the antenna of FIGURE 12; and, FIGURE 14 is a perspective view of a conical antenna illustrated schematically in FIGURE 8.
Figure 12:
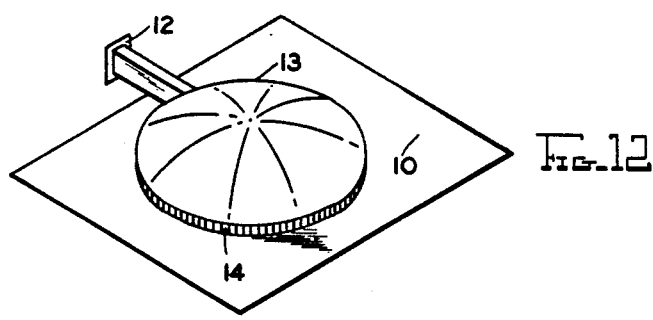
FIGURE 12 is a perspective view of a spherical cap antenna illustrated in FIGURE 2 and in side view in FIGURE 7.

The spherical structure antenna of FIGURE 2 is shown in a preferred constructed form in FIGURES 12 and 13. The lower side of the dielectric 15 is flat and lies against the ground plane 10. The other side (upper) is contoured in accordance with the above equations. The feed wave guide 12 blends into the lens at the rim 14.

Figure 11:
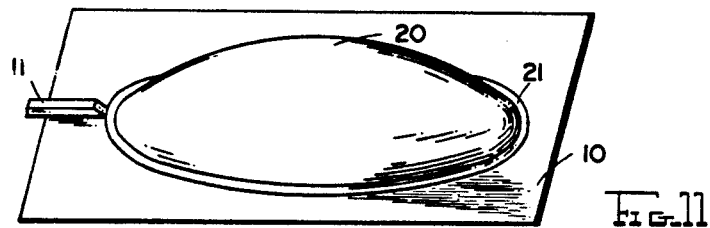
FIGURE 11 is perspective view of a parallel plate antenna illustrated schematically in FIGURE 3.

The parallel plate structure shown in FIGURE 3 is shown in perspective in FIGURE 11. In this antenna the ground plane 10 is contoured away from the general plane of the lines. The contour is upwardly in FIGURE 11, but could also be inverted to be downwardly. The contoured ground plane forms the bottom plate of two parallel plates. The upper plate 20 follows the contour of the lower plate except that the plate terminates at the rim of the contour, i.e., where lower plate blends into ground plane. The two plates are maintained apart by a dielectric material and are fed at the rim opening of the two plates.

Figure 14:
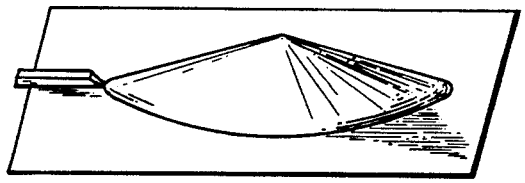

The conical antenna shown in FIGURE 8 is shown in perspective in FIGURE 14. The structure of this antenna is substantially identical to that of the spherical antenna except that it is conical in shape. The ground plane relation is the same and the manner of feed is the same.

As generally shown in FIGURE 10, it has been found that the feed need not be placed at the rim of the antenna, but may be moved towards the center. It is understood, of course, that proper design of the structure must be made to accommodate a feed point other than at the rim. The design equations for the feed placed within the rim are disclosed in the copending application, Ser. No. 343,-916, filed February 6, 1964, for Luneberg Lens Antenna System, by Carlton H. Walter and Roger C. Rudduck. Further, although it may be preferable to utilize a horn type of feed, the advantages of the present invention may be had with any other conventionally known feed.

Also disclosed in the copending application, supra, is the method and means for varying and controlling the vertical beam position of the radiation focussed at the rim of the antenna structure. It is shown in that application that by restricting the radiation to the rim of a surface-wave lens, the vertical beam position can be controlled by adjusting the phase distribution at the rim of the lens.

Although certain and specific embodiments have been shown, it is to be understood that modifications may be had thereto without departing from the spirit and scope of the invention. One obvious modification would be to utilize the present invention as an electromagnetic energy receiving antenna, since principles thereof are equally adaptable to receiving as well as transmitting.

What is claimed is:

1. A surface wave antenna comprising a non-planar ground wave bulbous structure being radially symmetrical and having a surface thereof for radiating isotropic electromagnetic energy therefrom, a radiating lens having a varying index of refraction satisfying the lens relation $$n=\frac{c}{v}=\sqrt{2-r^2}$$

where $r$ is the normalized radius, $c$ is the velocity of light in free space and $v$ is the phase velocity of a wave in the lens of the medium, said lens further comprising a circular configuration with a surface integrally formed with said ground plane structure and a free radiating surface with radial symmetry propagation capability; and means for coupling electromagnetic energy to said lens at the focus of said circular lens.

2. A Luneberg lens antenna system set forth in claim 1 wherein said lens further comprising a dielectric material and said lens surface configuration conforms to the configuration of said ground plane structure.

3. A Luneberg lens antenna system set forth in claim 1 wherein said ground plane is a convex spherical surface-wave structure, and said lens is positioned on and integrally formed with said convex spherical surface.

4. A Luneberg lens antenna system set forth in claim 1 wherein said ground plane is a parabolic surface-wave structure, and said lens is positioned on and integrally formed with said parabolic surface.

5. A Luneberg lens antenna system set forth in claim 1 wherein said ground plane is a conical surface-wave structure, and said lens is positioned on and integrally formed with said conical surface.

6. A Luneberg lens antenna system set forth in claim 1 wherein said ground plane is a spherical structure, and said lens is positioned on and integrally formed with said sphere.

References Cited by the Examiner

UNITED STATES PATENTS

| | | | |
|---|---|---|---|
| 2,576,181 | 11/1951 | Iams | 343—911 |
| 2,576,182 | 11/1951 | Wilkinson | 343—911 |
| 2,720,588 | 10/1955 | Jones | 343—911 |
| 2,814,037 | 11/1957 | Warren et al. | 343—754 |
| 2,814,040 | 11/1957 | Warren | 343—754 X |
| 2,822,542 | 2/1958 | Butterfield | 343—785 |
| 2,875,439 | 2/1959 | Berkowitz | 343—911 |
| 2,921,308 | 1/1960 | Hansen et al. | 343—754 |
| 3,067,420 | 12/1962 | Jones et al. | 343—754 X |
| 3,086,205 | 4/1963 | Berkowitz | 343—754 |

FOREIGN PATENTS

| | | |
|---|---|---|
| 688,374 | 3/1953 | Great Britain. |
| 161,847 | 3/1958 | France. |

OTHER REFERENCES

An Extension of The Luneberg-Type Lenses, by Eaton, NRL Report 4110, Feb. 16, 1963, pages 1–3 relied on.

HERMAN KARL SAALBACH, *Primary Examiner.*

ELI LIEBERMAN, *Examiner.*